United States Patent

Baettig et al.

(10) Patent No.: US 6,562,115 B2
(45) Date of Patent: May 13, 2003

(54) AZO DYES AND THEIR PREPARATION AND USE

(75) Inventors: Kurt Baettig, Praroman (CH); Gérald Jan, Villars-sur-Glâne (CH)

(73) Assignee: Ilford Imaging Switzerland GmbH (CH)

( * ) Notice: Subject to any disclaimer, the term of this patent is extended or adjusted under 35 U.S.C. 154(b) by 134 days.

(21) Appl. No.: 09/867,081

(22) Filed: May 29, 2001

(65) Prior Publication Data

US 2002/0017218 A1 Feb. 14, 2002

(30) Foreign Application Priority Data

May 30, 2000 (EP) .............................. 00810478

(51) Int. Cl.$^7$ ................. C09D 11/02; C09B 29/00; C07C 245/08
(52) U.S. Cl. .............. 106/31.51; 534/862; 8/437; 8/641; 8/673; 8/917; 8/918; 8/919
(58) Field of Search ................. 106/31.51; 534/862; 8/641, 673, 437, 917, 918, 919

(56) References Cited

U.S. PATENT DOCUMENTS

| | | | | |
|---|---|---|---|---|
| 1,123,430 A | * | 1/1915 | Tropp | 534/862 |
| 2,134,038 A | * | 10/1938 | Fleischhauer | 534/862 |
| 2,274,717 A | * | 3/1942 | Lyford | 534/862 |
| 2,849,437 A | * | 8/1958 | Montmollin et al. | 534/860 |
| 3,116,280 A | * | 12/1963 | Frisch et al. | 534/650 |
| 3,655,388 A | | 4/1972 | Piller | |
| 3,709,871 A | * | 1/1973 | Ditzer et al. | 534/862 |
| 3,889,271 A | * | 6/1975 | Freytag et al. | 347/100 |
| 4,162,249 A | * | 7/1979 | Yelland | 534/861 |
| 4,626,284 A | | 12/1986 | Ohta | |
| 4,703,113 A | | 10/1987 | Baxter | |
| 4,963,189 A | | 10/1990 | Hindagolla | |
| 5,542,970 A | * | 8/1996 | Miura et al. | 106/31.43 |
| 5,607,502 A | * | 3/1997 | Hassenruck et al. | 106/31.51 |
| 5,794,507 A | * | 8/1998 | Strong | 91/375 A |
| 6,183,549 B1 | * | 2/2001 | Wight | 106/31.51 |

FOREIGN PATENT DOCUMENTS

| | | |
|---|---|---|
| CH | 359812 | 1/1960 |
| DE | 19735769 A1 | 2/1999 |
| EP | 0425150A2 A3 | 5/1991 |
| EP | 0597672A2 A3 | 11/1993 |
| EP | 0755984 A1 | 1/1997 |
| EP | 0859033 A1 | 2/1997 |
| EP | 1031614 A1 | 2/1999 |
| EP | 0918074 A1 | 5/1999 |
| EP | 0924263 A1 | 6/1999 |
| EP | 0953613 A2 | 11/1999 |
| EP | 0982371 A1 | 3/2000 |
| GB | 2289473 A | 11/1995 |
| WO | WO 96/24635 | 8/1996 |
| WO | WO 96/24636 | 8/1996 |

* cited by examiner

Primary Examiner—Helene Klemanski
(74) Attorney, Agent, or Firm—Onofrio Law; Dara L. Onofrio, Esq.

(57) ABSTRACT

Monoazo dyes of formulas (III)

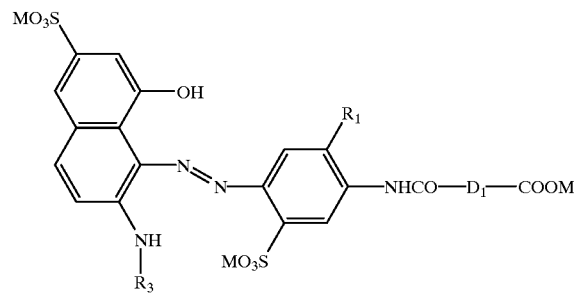

and (IV)

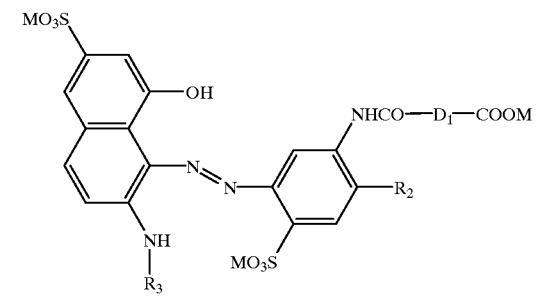

wherein $R_1$, $R_2$, $R_3$, $D_1$ and M are as defined in the specification, are excellent dyes for dyeing and printing of cellulose containing materials and especially for the preparation of inks for ink jet printing.

11 Claims, No Drawings

AZO DYES AND THEIR PREPARATION AND USE

FIELD OF THE INVENTION

The invention relates to novel monoazo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are essentially of two types: In continuous stream ink jet printing systems, ink is emitted in a continuous stream under pressure through a nozzle. The stream breaks up into droplets at a certain distance from the nozzle. If a specific location on the recording sheet has to be printed the individual droplets are directed to the recording sheet, otherwise they are directed to a gutter. This is done for example by charging unnecessary droplets in accordance with digital data signals and passing them through an electric static field which adjusts the trajectory of these droplets in order to direct them to the gutter. The inverse procedure may also be used wherein uncharged droplets are directed to the gutter.

In the non-continuous process, or the so-called "drop-on-demand" systems, a droplet is generated in accordance with digital data signals only if it is to be placed onto the recording sheet.

In the classical ink jet printing process the traditional four-color system YMCK is used, wherein a yellow, a magenta, a cyan and a black ink are printed onto the recording sheet. In order to improve color rendering, further inks containing for example orange, red, blue, or green dyes are used. Such dyes are called "spot dyes". In the classical ink jet printing process, spot dyes may be generated only by mixing of the corresponding primary colors. Spot colors generated in this way (mixed colors) are rather dull and not very brilliant. Therefore, there is a need for new, brilliant red dyes with excellent light stability and high solubility in the aqueous ink medium for the new, multicolor ink systems.

Although a number of red dyes have been proposed as dyes for ink jet printing, none meets all the necessary requirements.

The dye of formula (I) (Acid Red 37) having a red hue is described in patent application EP 0,953,613.

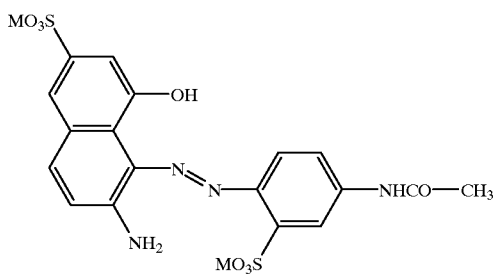

This dye shows the wanted hue, but its solubility is not sufficient.

The dye of formula (II) having a magenta hue is described in patent application WO 96-24,636 (Example 102).

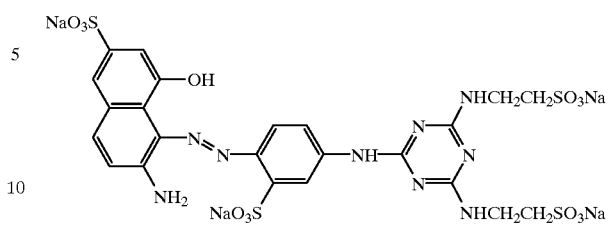

This dye shows high solubility, but it is too dull and too bluish.

These two dyes, representing the state of the art, do not satisfy all the required demands for spot dyes when used in red recording liquids for ink jet printing. Neither do they satisfy all the required demands if they are used in the formulation of inks for ink jet printing that should provide brilliant images or colorings with excellent color rendition (extended gamut) on any type of recording medium as plain or coated paper, coated or uncoated, opaque or transparent synthetic materials, because these dyes are either not soluble enough or show a too bluish red.

Dyes used for such recording liquids have to show a good solubility in the essentially aqueous ink liquid; they have to penetrate into the recording medium and should not show dye aggregation on the surface of the recording medium ("bronzing"). They need to provide printed images having high optical density, good water fastness, and good light stability. They need to be stable in the ink even when the recording liquid is stored for a long time under adverse conditions. Various types of compositions have been proposed as inks for ink jet printing. Typical inks comprise one or more dyes, water, organic cosolvents and other additives.

The inks have to meet the following criteria:
(1) The ink gives images of excellent quality on any type of recording medium.
(2) The ink gives printed images exhibiting good water fastness.
(3) The ink gives printed images exhibiting good light stability.
(4) The ink gives printed images exhibiting excellent smudge behavior.
(5) The ink does not clog jetting nozzles of the ink jet printers even when these are kept uncapped while recording is suspended for long periods.
(6) The ink may be stored for long periods of time without deterioration of its quality.
(7) The values of the physical properties of the inks, such as viscosity, conductivity and surface tension are all within defined ranges well suited for the intended use.
(8) The ink has to be non-toxic, not flammable and safe.

SUMMARY OF THE INVENTION

Accordingly, an object of the invention is to provide novel monoazo dyes, of the general formulas (III) and (IV), and processes for their preparation. These dyes show a red hue and, at the same time, excellent light stability and high solubility. They provide images or colorings showing good overall properties, in particular in the ink jet printing process, where they provide images with maximum color rendition, especially in six-color printing.

Another object of the invention is the provision of liquid dye preparations, especially of recording liquids for ink jet printing, showing a spectrally unchanged hue on any type of recording medium as plain or coated paper, coated or uncoated, opaque or transparent synthetic materials.

A further object of the present invention is to provide recording liquids satisfying also all the other requirements mentioned above.

DETAILED DESCRIPTION OF THE INVENTION

The present invention relates to novel monoazo dyes of general formulas (III)

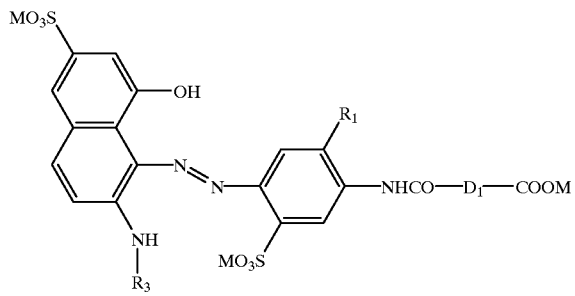

(III)

and (IV)

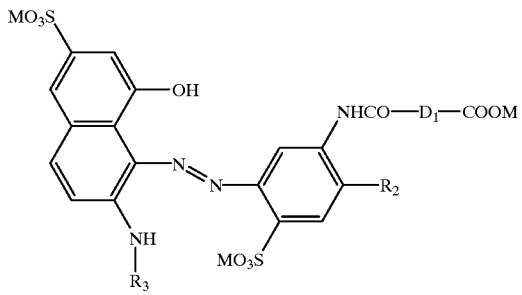

(IV)

wherein $R_1$, $R_2$ independently represent hydrogen, alkyl or alkoxy each having 1 to 4 C atoms, fluoro, chloro or bromo;

$R_3$ represents hydrogen, alkyl with 1 to 6 C atoms, substituted alkyl with 2 to 6 C atoms, wherein the substituents are selected from the group consisting of cyano, carboxy, hydroxy, carboxymethyl and carboxyethyl, or phenyl or phenyl substituted by methyl, chloro, bromo, carboxy or sulfo;

$D_1$ represents unsubstituted or substituted alkylene with 2 or 3 C atoms, wherein the substituents are selected from the group consisting of alkyl or alkenyl with 1 to 6 C atoms, fluoro, chloro and bromo; $CH_2OCH_2$ or $CH=CH$ or where $D_1$ is part of an aliphatic ring consisting of 5 or 6 C atoms; and M represents hydrogen, a metal cation or an ammonium cation, which may be substituted by one or more alkyl or substituted alkyl groups each having from 1 to 18 C atoms.

Preferred are monoazo dyes of formulas (III) and (IV), wherein M is as described above; and $R_1$, $R_2$ independently represent hydrogen, methyl, methoxy or chloro;

$R_3$ represents hydrogen, alkyl with 1 to 6 C atoms, substituted alkyl with 2 or 3 C atoms, wherein the substituents are selected from the group consisting of cyano, carboxy and hydroxy; and $D_1$ represents n-alkylene with 2 or 3 C atoms, $CH_2OCH_2$ or $CH=CH$.

Also preferred are monoazo dyes of formulas (III) and (IV), wherein M, $R_1$, $R_2$ and $D_1$ are as described above; and $R_3$ represents hydrogen, methyl, $CH_2CH_2COOH$ or $CH_2CH_2OH$.

Especially preferred are monoazo dyes of formulas (III) and (IV), wherein M, $R_1$, $R_2$ und $D_1$ are as described above; and $R_3$ represents hydrogen.

Also preferred are monoazo dyes of general formula (IV), wherein M is as described above; and $R_2$ represents hydrogen, methyl, methoxy or chloro;

$R_3$ represents hydrogen, alkyl with 1 to 6 C atoms, substituted alkyl with 2 to 6 C atoms, wherein the substituents are selected from the group consisting of cyano, carboxy, hydroxy, carboxymethyl and carboxyethyl; or phenyl or phenyl substituted by methyl, chloro, bromo, carboxy or sulfo; and $D_1$ represents unsubstituted or substituted alkylene with 2 or 3 C atoms, wherein the substituents are selected from the group consisting of alkyl or alkenyl with 1 to 6 C atoms, fluoro, chloro and bromo; $CH_2OCH_2$ or where $D_1$ is part of an aliphatic ring consisting of 5 or 6 C atoms.

The prepared dyes of general formula (III) are listed in Table 1 together with the position of their absorption maximum in aqueous solution:

TABLE 1

| Compound No. | $R_1$ | $R_3$ | $D_1$ | M | $\lambda_{max}$ (nm) in $H_2O$ |
|---|---|---|---|---|---|
| 100 | H | H | $(CH_2)_2$ | Na | 512 |
| 101 | H | H | $(CH_2)_3$ | Na | 512 |
| 102 | $CH_3$ | H | $(CH_2)_2$ | Na | 509 |
| 103 | $CH_3$ | H | $(CH_2)_3$ | Na | 509 |
| 104 | H | H | $CH_2OCH_2$ | Na | 512 |
| 105 | H | $CH_3$ | $(CH_2)_2$ | Na | 548 |
| 106 | H | $CH_2CH_2CN$ | $(CH_2)_2$ | Na | 526 |
| 107 | H | $CH_2CH_2COOM$ | $(CH_2)_2$ | K | 547 |
| 108 | H | $CH_2CH_2OH$ | $(CH_2)_2$ | Na | 526 |
| 109 | H | —⟨benzene-COOM⟩ | $(CH_2)_2$ | Na | 535 |
| 110 | H | —⟨benzene-$SO_3M$⟩ | $(CH_2)_2$ | Na | 531 |
| 111 | H | H | $CH=CH$ | Na | 516 |
| 112 | H | $CH_3$ | $CH=CH$ | Na | 552 |

The prepared dyes of general formula (IV) are listed in Table 2 together with the position of their absorption maximum in aqueous solution:

TABLE 2

| Compound No. | $R_1$ | $R_3$ | $D_1$ | M | $\lambda_{max}$ (nm) in $H_2O$ |
|---|---|---|---|---|---|
| 120 | H | H | $(CH_2)_2$ | Na | 506 |
| 121 | H | H | $(CH_2)_3$ | Na | 506 |
| 122 | $OCH_3$ | H | $(CH_2)_2$ | Na | 508 |
| 123 | $OCH_3$ | H | $(CH_2)_3$ | Na | 508 |
| 124 | $OCH_3$ | $CH_3$ | $(CH_2)_2$ | Na | 549 |
| 125 | $OCH_3$ | $CH_2CH_2CN$ | $(CH_2)_2$ | Na | 543 |
| 126 | $OCH_3$ | $CH_2CH_2COOM$ | $(CH_2)_2$ | K | 547 |
| 127 | H | $CH_3$ | $CH{=}CH$ | Na | 539 |
| 128 | H | $CH_2CH_2OH$ | $(CH_2)_2$ | Na | 521 |

The compounds of general formulas (III) and (IV) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethyl ammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium and tetraalkylammonium such as tetramethylammonium or tetrabutylammonium.

The invention not only covers pure dyes of general formulas (III) and (IV), but also mixtures of these compounds or mixtures with other dyes.

The invention further claims two processes (A) and (B) for the preparation of the monoazo dyes of formulas (III) and (IV) according to the invention, characterized in that in process (A)

a compound of general formula (V)

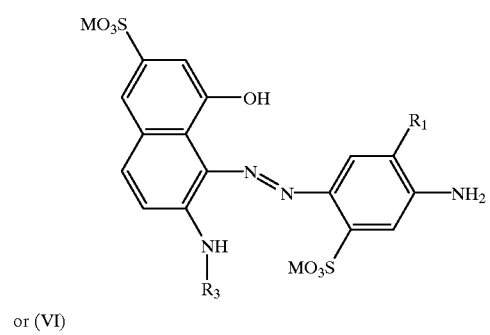

(V)

or (VI)

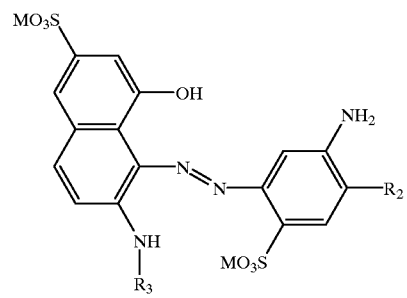

(VI)

wherein $R_1$, $R_2$, $R_3$ and M are as defined above, is reacted with a compound of formula (VII),

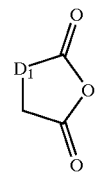

(VII)

wherein $D_1$ is as defined above, under conditions that the cyclic anhydride of formula (VII) reacts with the amines of formulas (V) or (VI) with formation of the amide to the dyes of general formulas (III) or (IV) according to the invention.

Alternatively, in process (B)

(i) a compound of general formula (VIII)

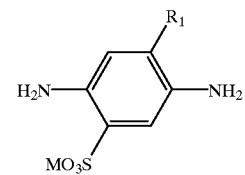

(VIII)

or (IX),

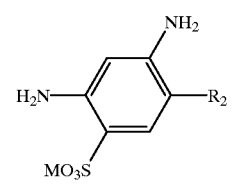

(IX)

wherein $R_1$, $R_2$ and M are as defined above, is reacted with a compound of formula (VII), wherein $D_1$ is as defined above, under conditions that the amine reacts selectively in the para or meta position to the sulfo group with formation of the amides of formulas (X) or (XI)

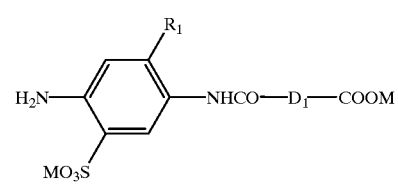

(X)

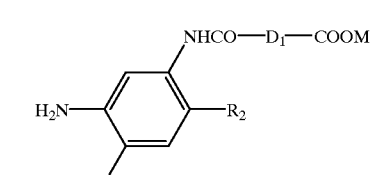

(XI)

and (ii) the anilines of formulas (X) and (XI) are diazotized and coupled with the compound of general formula (XII)

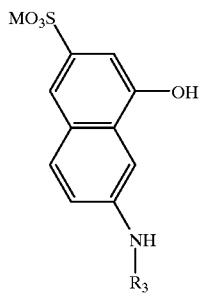

(XII)

wherein R₃ is as defined above, to form the dyes of general formulas (III) and (IV).

The dyes of formulas (III) and (IV) according to the invention are used to dye cellulose containing materials, paper, cotton and viscose as well as leather and wool to provide dyed material with good water fastness and light stability.

Methods well known in the textile and paper industries for dyeing with substantive dyes may be used with the dyes, preferably for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one dye of general formulas (III) and (IV). The use of such liquid dye preparations is preferred for paper dyeing. Such stable, liquid, preferably aqueous, and concentrated dye preparations may be obtained by using methods well known in the art, preferably by dissolving in suitable solvents. The possibility of preparation of such stable aqueous concentrated preparations in the course of dye synthesis itself, without intermediate isolation of the dye, is of particular advantage.

Dyes or mixtures of dyes of general formulas (III) and (IV) are excellent dyes for the preparation of recording liquids for ink jet printing, especially of red inks for six-color printing. The dyes have, however, also show excellent properties as magenta dyes in four-color printing.

A suitable ink comprises one or more of the compounds according to the invention in a liquid, essentially aqueous medium. The ink contains from 0.5 to 20% by weight, preferably from 0.5 to 8% by weight, of these compounds, based on the total weight of the ink. The liquid medium is preferably water or a mixture comprising water and water miscible organic solvents. Suitable solvents are given for example in U.S. Pat. Nos. 4,626,284, 4,703,113 and U.S. Pat. No. 4,963,189 and in patent applications GB 2,289,473, EP 0,425,150 and EP 0,597,672.

Color ink jet printers typically use three inks of different colors: yellow, magenta and cyan, and optionally black. A particular set of inks is called an "ink set". In order to improve color rendering, especially of skin tones, further inks with orange and red color are used. The selected dyes used to prepare the inks are called a "dye set". Such a dye set enables the production of high quality images, which meet commercial requirements, by ink jet printing, especially giving an excellent representation of skin tones. The yellow, magenta, cyan, red, orange and black ink each comprise from 0.5 to 20% by weight, preferably from 0.5 to 8% by weight, of dyes, based on the total weight of such an ink.

Suitable magenta inks for such an ink set comprise a monoazo dye according to the invention or a mixture of monoazo dyes of general formulas (III) and (IV). The magenta ink may contain further magenta dyes such as Acid Red 52, Acid Red 82, Acid Red 180, Acid Red 249, Acid Red 254, Acid Red 289, Acid Red 357, Reactive Red 23, Reactive Red 24, Reactive Red 45, Reactive Red 81, Reactive Red 120, Reactive Red 159, Reactive Red 180, Basic Violet 10, Direct Red 75, Cibacron Red P-6B and Lanasol Red 2R, or magenta dyes as disclosed in patent applications WO 96-24,636 and EP 0,755,984.

Preferred magenta dyes for the magenta ink of such an ink set are the monoazo dyes of general formulas (III) and (IV) according to the invention, or a mixture of the monoazo dyes of general formulas (III) and (IV) according to the invention with dye No. 102 of patent application WO 96-24,636, with Reactive Red 23 or with Acid Red 52.

Suitable yellow inks for such an ink set comprise one or more yellow dyes such as Acid Yellow 17, Acid Yellow 23, Acid Yellow 250, Reactive Yellow 39, Solvent Green 7, Direct Yellow 5, Direct Yellow 86, Direct Yellow 132 and Direct Yellow 173 or yellow dyes as disclosed in patent applications WO 96-24,635, EP 0,755,984, EP 0,918,074 and EP 1,031,614.

Preferred dyes for the yellow ink of such an ink set are the dye No. 100 of patent application EP 0,755,984 or the dye No. 100 of patent application EP 1,031,614.

Suitable cyan inks for such an ink set comprise a dye or a mixture of dyes of such as Acid Blue 9, Direct Blue 199, Reactive Blue 2, Drimarene Brilliant Green K4G or Basacid Blue 762.

Preferred cyan dyes for such an ink set are Direct Blue 199 and Acid Blue 9.

Suitable black inks for such an ink set comprise a dye or a mixture of dyes of such as Food Black 2, Direct Black 17, Direct Black 19, Direct Black 31, Direct Black 168 and Direct Black 194 or black dyes as disclosed in patent applications EP 0,859,033, EP 0,924,263 and EP 0,982,371. Preferred black dyes for the black ink of such an ink set are the dye No. 19 of patent application EP 0,982,371, Direct Black 31 or Direct Black 194.

Suitable red inks for such an ink set comprise a monoazo dye according to the invention or a mixture of monoazo dyes of general formulas (III) and (IV). The red ink may contain further red dyes such as Basantole Red 311, Cibacron Orange MI-2R or red dyes as disclosed in patent application WO 96-24,636.

Preferred red dyes for the red ink of such an ink set are the monoazo dyes according to the invention, or a mixture of monoazo dyes of general formulas (III) and (IV) according to the invention.

Suitable orange inks for such an ink set comprise a dye or a mixture of dyes such as Cibacron Orange 2R, Acid Red 496, Acid Orange 7, Acid Orange 74, Solophenyl Orange TGL, Bayscript Orange ZAW, Drimarene Brilliant Orange K-3R, Anthosine Orange 35 or orange dyes as disclosed in patent application WO 96-24,635.

Preferred orange dyes for the orange ink of such an ink set are the azo dye of formula (8) of patent application WO 96-24,635 with the substituent OCH₃ for R₃ and R₄, H for R₅ and CH₂CH₂SO₃M for R₆, or a mixture of this dye with a monoazo dye of general formulas (III) and (IV) according to the invention.

The present invention will be illustrated in more detail by the following examples without limiting the scope of the claimed compounds in any way.

EXAMPLES

Example 1

Compound No. 100 of Table 1 was prepared in the following way using process (A):
Solution A:
10.6 g (20 mmoles) of Acid Red 34 of formula (XIII) (Content: 91%)

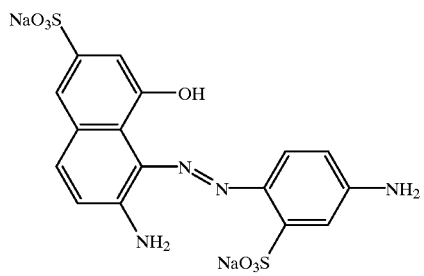

(XIII)

and 60 ml of water were stirred for 1 hour at room temperature.
Preparation of Dye No. 100:
5 g (50 mmoles) of solid succinic anhydride were added within 30 minutes in small quantities at a temperature of 20° C. under stirring to solution A while maintaining pH at a value from 5 to 6 by simultaneous addition of an aqueous solution of sodium hydroxide (15%). Stirring was continued for a further 2 hours at room temperature. The dye was salted out by addition of sodium chloride, filtered off, purified by washing with water/ethanol and dried. 9.4 g of dye No. 100 were obtained in this way.

Example 2

Compound No. 101 of Table 1 was prepared in the following way using process (A):
5.7 g (50 mmoles) of solid glutaric anhydride were added within 30 minutes in small quantities at a temperature of 40° C. under stirring to solution A of example 1 while maintaining pH at a value from 4 to 5 by simultaneous addition of an aqueous solution of sodium hydroxide (15%). Stirring was continued for a further 2 hours at room temperature. The dye was salted out by addition of sodium chloride, filtered off, purified by washing with water/ethanol and dried. 10.8 g of dye No. 101 were obtained in this way.

The dyes No. 102 to 112 and No. 122 to 128 may be prepared in a similar way by using appropriate starting materials.

Example 3

Compound No. 120 of Table 2 was prepared in the following way using process (B):
Preparation of the Amide of Formula (XIV):
13 g (130 mmoles) of solid succinic anhydride were added within 30 minutes in small quantities at a temperature of 20° C. under stirring to solution of 21 g (100 mmoles) of the sodium salt of 1,3-phenylenediamine-4-sulfonic acid in 50 ml of water while maintaining pH at a value from 6 to 7 by simultaneous addition of an aqueous solution of sodium hydroxide (15%). Stirring was continued for a further 2 hours at room temperature. Celite, available from Fluka Chemie, Buchs, Switzerland, was added and the solution was filtered. The dye in the filtered solution was precipitated by reducing pH to a value of 3.0; the precipitate was filtered off and dried. 25.6 g of the amide of formula (XIV) were obtained in this way.

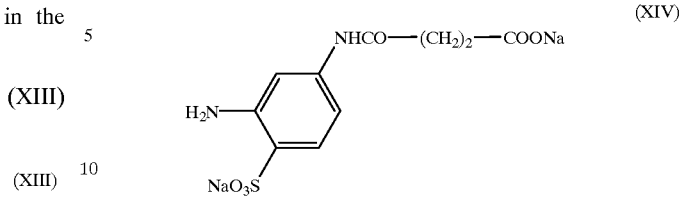

(XIV)

Solution A:
6.4 g (20 mmoles) of the amide of formula (XIV) were suspended in 60 ml of water and 5 ml of aqueous hydrochloric acid (37%) were added under stirring. The mixture was cooled down to a temperature between 0° C. and 5° C. 5 ml of an aqueous solution of sodium nitrite (4N) were added drop wise at an internal temperature between 0° C. and 5° C. within 20 minutes under stirring. Stirring was continued for 1 hour at this temperature. Afterwards the excess of nitrous acid was removed by reaction with sulfaminic acid.
Preparation of Dye No. 120:
The cold solution A was added within 60 minutes at an internal temperature of 5° C. to 10° C. to a solution of 5.7 g (20 mmoles) of the sodium salt of 2-amino-8-hydroxynaphthalene-6-sulfonic acid (91.3%) in 50 ml of water while maintaining pH at a value from 2 to 4 by simultaneous addition of an aqueous solution of sodium hydroxide (20%). Stirring was continued for 2 hours at a temperature between 5° C. und 20° C. and for a further 16 hours at room temperature. The dye was salted out by addition of sodium chloride, the precipitate was filtered off, purified by washing with water/ethanol and dried. 8.2 g of dye No. 120 were obtained in this way.

Example 4

Compound No. 121 of Table 2 was prepared in the following way using process (B):
Preparation of the Amide of Formula (XV):
14.8 g (130 mmoles) of solid glutaric anhydride were added within 30 minutes in small quantities at a temperature of 20° C. under stirring to solution of 21 g (100 mmoles) of the sodium salt of 1,3-phenylenediamine-4-sulfonic acid in 60 ml of water while maintaining pH at a value from 4 to 5 by simultaneous addition of an aqueous solution of sodium hydroxide (15%). Stirring was continued for a further 2 hours at room temperature. The precipitate was filtered off and dried. 13.2 g of the amide of formula (XV) were obtained in this way.

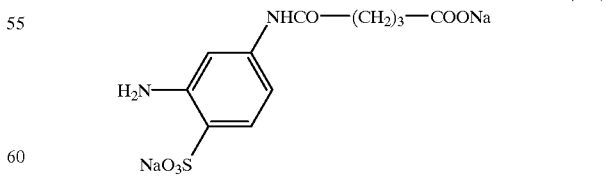

(XV)

Solution A:
6.6 g (20 mmoles) of the amide of formula (XV) were suspended in 60 ml of water and 5 ml of aqueous hydrochloric acid (37%) were added under stirring. The mixture was cooled down to a temperature between 0° C. and 5° C.

5 ml of an aqueous solution of sodium nitrite (4N) were added drop wise at an internal temperature between 0° C. and 5° C. under stirring. Stirring was continued for 1 hour at this temperature. Afterwards the excess of nitrous acid was removed by reaction with sulfaminic acid.

Preparation of Dye No. 121:

The cold solution A was added within 60 minutes at an internal temperature of 5° C. to 10° C. to a solution of 5.7 g (20 mmoles) of the sodium salt of 2-amino-8-hydroxynaphthalene-6-sulfonic acid (91.3%) in 50 ml of water while maintaining pH at a value from 2 to 4 by simultaneous addition of an aqueous solution of sodium hydroxide (20%). Stirring was continued for 2 hours at a temperature between 5° C. und 20° C. and for a further 16 hours at room temperature. The dye was salted out by addition of sodium chloride, the precipitate was filtered off, purified by washing with water/ethanol and dried. 8.6 g of dye No. 121 were obtained in this way.

Preparation of Ink Examples

The present invention, as far as it relates to inks, is further illustrated by the following examples using dyes according to the invention from Tables 1 and 2 and dyes representing the state of the art. 100 g of each ink were prepared by heating the necessary amount of dye (2–7 g), glycerol (5 g), ethylene glycol (5 g) and a biocide solution (Promexal X50, available from Zeneca, Manchester, England) (1.2 g) together with water at a temperature of 50° C. under stirring for about 1 hour. The resulting solution was cooled down to a temperature of 20° C., the value of pH was adjusted to 7.5 and the solution was passed through a Millipore® filter of 0.5 µm pore diameter. The dye quantity was adjusted in such a way that the optical density of the printed images was similar for all dyes.

Testing of Ink Examples

The inks were then jetted onto the recording media Ilfojet Photo Grade Glossy RC Paper UM2GP6 (material 1) and Ilfojet Photo Grade Clear Film UMCF4 (material 2) (both available from ILFORD Imaging Switzerland GmbH, Fribourg, Switzerland) with a Hewlett-Packard ink jet printer HP560. Afterwards the printed images were tested.

Tests

The following test methods for dye solubility and color coordinates were used:

(A) Dye Solubility

An excess of dye was vigorously stirred in deionised water for 1 hour at a temperature of 50° C. The mixture was then cooled down to a temperature of 20° C. and filtered. Dye solubility was determined spectroscopically in the clear filtered solution.

(B) Color Coordinates

L*a*b* values were measured on printed samples using a Gretag SPM 100 spectrometer, available from Gretag AG, Regensdorf, Switzerland.

Results

Dye solubilities determined by the method as described above are listed in Table 3.

TABLE 3

| Dye No. | Solubility (in g per 100 ml of water) |
|---|---|
| Acid Red 37 | 5 |
| 100 | 24 |
| 101 | 30 |
| 120 | 16 |

The results in Table 3 show the significantly higher solubility of the red dyes No. 100, 101 and 120 according to the invention in comparison to the known dye Acid Red 37.

L*a*b* values (illuminant D65) of dyes according to the invention and of dyes that are state of the art are listed in Table 4.

TABLE 4

| Compound No. | L*a*b* values (material 1) | L*a*b* values (material 2) |
|---|---|---|
| 100 | 45.4/75.2/12.7 | 49.6/81.8/1.2 |
| 101 | 45.7/75.8/12.0 | 49.5/83.0/−0.5 |
| 102 | 44.9/73.3/17.9 | 49.1/80.7/10.2 |
| 103 | 46.5/72.4/15.9 | 50.1/80.2/6.9 |
| 104 | 46.6/74.0/9.6 | 48.4/83.2/2.1 |
| 112 | 48.6/74.7/24.3 | 53.3/79.9/12.7 |
| 113 | 50.0/72.8/19.5 | 53.2/79.6/16.7 |
| 120 | 46.5/69.5/31.2 | 51.7/75.3/26.8 |
| 121 | 47.3/71.0/31.6 | 52.9/76.5/24.5 |
| I (Acid Red 37) | 44.7/74.5/16.5 | 48.4/81.4/6.4 |
| II | 42.0/75.6/−1.2 | 44.5/84.7/−13.0 |

A comparison of the measured L*a*b* values of printed samples, wherein the inks contain dyes according to the invention, clearly shows that the inks containing the claimed dyes (especially with dyes 120 and 121) have higher b* values than inks containing the known monoazo dyes (I) and (II), e.g. they show a considerably redder hue. The reproduction of brilliant red colors, as for example Coca Cola® red (L*a*b* value 44.5/72.7/41.4), requires red, brilliant dyes with a high b* value. The dyes according to the invention are therefore very suitable as red dyes in six-color ink jet printing, where they may be used as spot dyes.

Finally, variations from the examples given herein are possible in view of the above disclosure. Therefore, although the invention has been described with reference to certain preferred embodiments, it will be appreciated that other dyes may be devised, which are nevertheless with the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

What is claimed is:

1. Monoazo dyes of general formulas (III)

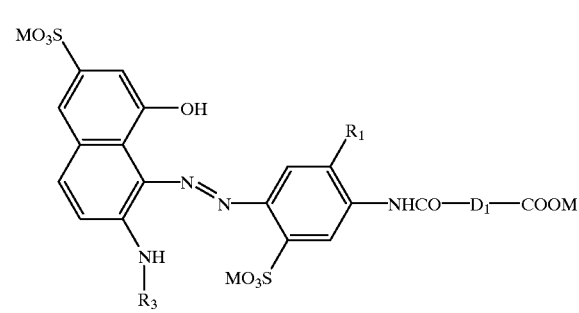

-continued and (IV)

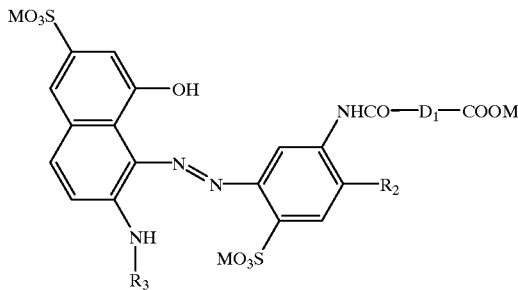

wherein

- $R_1$, $R_2$ independently represent hydrogen, alkyl or alkoxy each having 1 to 4 C atoms, fluoro, chloro or bromo;
- $R_3$ represents hydrogen, alkyl with 1 to 6 C atoms, substituted alkyl with 2 to 6 C atoms, wherein the substituents are selected from the group consisting of cyano, carboxy, hydroxy, carboxymethyl and carboxyethyl; or phenyl or phenyl substituted by methyl, chloro, bromo, carboxy or sulfo;
- $D_1$ represents unsubstituted or substituted alkylene with 2 or 3 C atoms, wherein the substituents are selected from the group consisting of alkyl or alkenyl with 1 to 6 C atoms, fluoro, chloro and bromo; $CH_2OCH_2$ or $CH=CH$ or where $D_1$ is part of an aliphatic ring consisting of 5 or 6 C atoms; and
- M represents hydrogen, a metal cation or an ammonium cation, which may be substituted by one or more alkyl or substituted alkyl groups each having from 1 to 18 C atoms.

2. Monoazo dyes according to claim 1, wherein

M is as defined in claim 1;

$R_1$, $R_2$ independently represent hydrogen, methyl, methoxy or chloro;

$R_3$ represents hydrogen, alkyl with 1 to 6 C atoms, substituted alkyl with 2 or 3 C atoms, wherein the substituents are selected from the group consisting of cyano, carboxy and hydroxy; and $D_1$ represents n-alkylene with 2 or 3 C atoms, $CH_2OCH_2$ or $CH=CH$.

3. Monoazo dyes according to claim 2, wherein $R_1$, $R_2$, $D_1$ are as defined in claim 2;

M represents hydrogen, a metal cation or an ammonium cation, which may be substituted by one or more alkyl or substituted alkyl groups each having from 1 to 18 C atoms; and $R_3$ represents hydrogen, methyl, $CH_2CH_2COOH$ or $CH_2CH_2OH$.

4. Monoazo dyes according to claim 2, wherein $R_1$, $R_2$, $D_1$ are as defined in claim 2;

M represents hydrogen, a metal cation or an ammonium cation, which may be substituted by one or more alkyl or substituted alkyl groups each having from 1 to 18 C atoms; and $R_3$ represents hydrogen.

5. Monoazo dyes of general formula (IV), wherein $R_2$ represents hydrogen, methyl, methoxy or chloro;

$R_3$ represents hydrogen, alkyl with 1 to 6 C atoms, substituted alkyl with 2 to 6 C atoms, wherein the substituents are selected from the group consisting of cyano, carboxy, hydroxy, carboxymethyl and carboxyethyl; or phenyl or phenyl substituted by methyl, chloro, bromo, carboxy or sulfo;

$D_1$ represents unsubstituted or substituted alkylene with 2 or 3 C atoms, wherein the substituents are selected from the group consisting of alkyl or alkenyl with 1 to 6 C atoms, fluoro, chloro and bromo; $CH_2OCH_2$ or $CH=CH$ or where $D_1$ is part of an aliphatic ring consisting of 5 or 6 C atoms; and M represents hydrogen, a metal cation or an ammonium cation, which may be substituted by one or more alkyl or substituted alkyl groups each having from 1 to 18 C atoms.

6. Process for the preparation of monoazo dyes according to claim 1, wherein a compound of general formula (V)

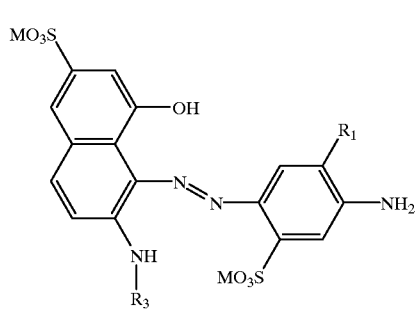

or (VI)

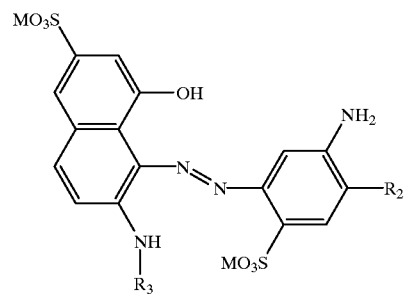

wherein $R_1$, $R_2$, $R_3$ and M are as defined in claim 1, is reacted with a compound of formula (VII),

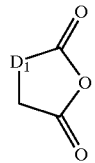

wherein $D_1$ is as defined in claim 1, under conditions that the cyclic anhydride of formula (VII) reacts with the amines of formulas (V) or (VI) with the formation of the amide to the dyes of general formulas (III) or (IV) according to the invention.

7. Process for the preparation of monoazo dyes according to claim 1, wherein (i) a compound of general formula (VIII)

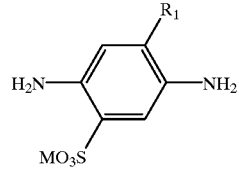
(VIII)

or (IX),

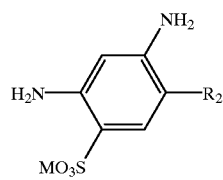
(IX)

wherein $R_1$, $R_2$ and M are as defined in claim 1, is reacted with a compound of formula (VII), wherein $D_1$ is as defined in claim 1, under conditions that the amine selectively reacts in the para or meta position to the sulfo group with the cyclic anhydride of formula (VII) with the formation of the amides of formulas (X) or (XI)

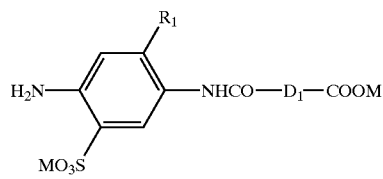
(X)

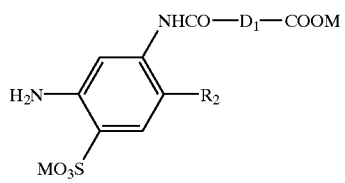
(XI)

and (ii) the anilines of formulas (X) and (XI) are diazotized and coupled with a compound of general formula (XII)

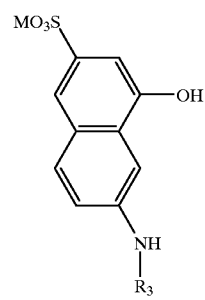
(XII)

wherein $R_3$ is as defined in claim 1, with the formation of the dyes of general formulas (III) and (IV).

8. Process for dyeing cellulose containing materials, paper, cotton, viscose, leather and wool by applying thereto a monoazo dye according to claim 1.

9. Liquid dye preparations comprising at least one monoazo dye or a mixture of monoazo dyes according to claim 1.

10. Inks for ink jet printing, comprising at least one monoazo dye or a mixture of monoazo dyes according to claim 1.

11. Inks for ink jet printing, comprising in addition to at least one monoazo dye or a mixture of monoazo dyes according to claim 1 one or more other dyes.

* * * * *